Aug. 19, 1952     M. U. MORRIS ET AL     2,607,151
ARTIFICIAL FROG FISHING BAIT
Filed July 2, 1949
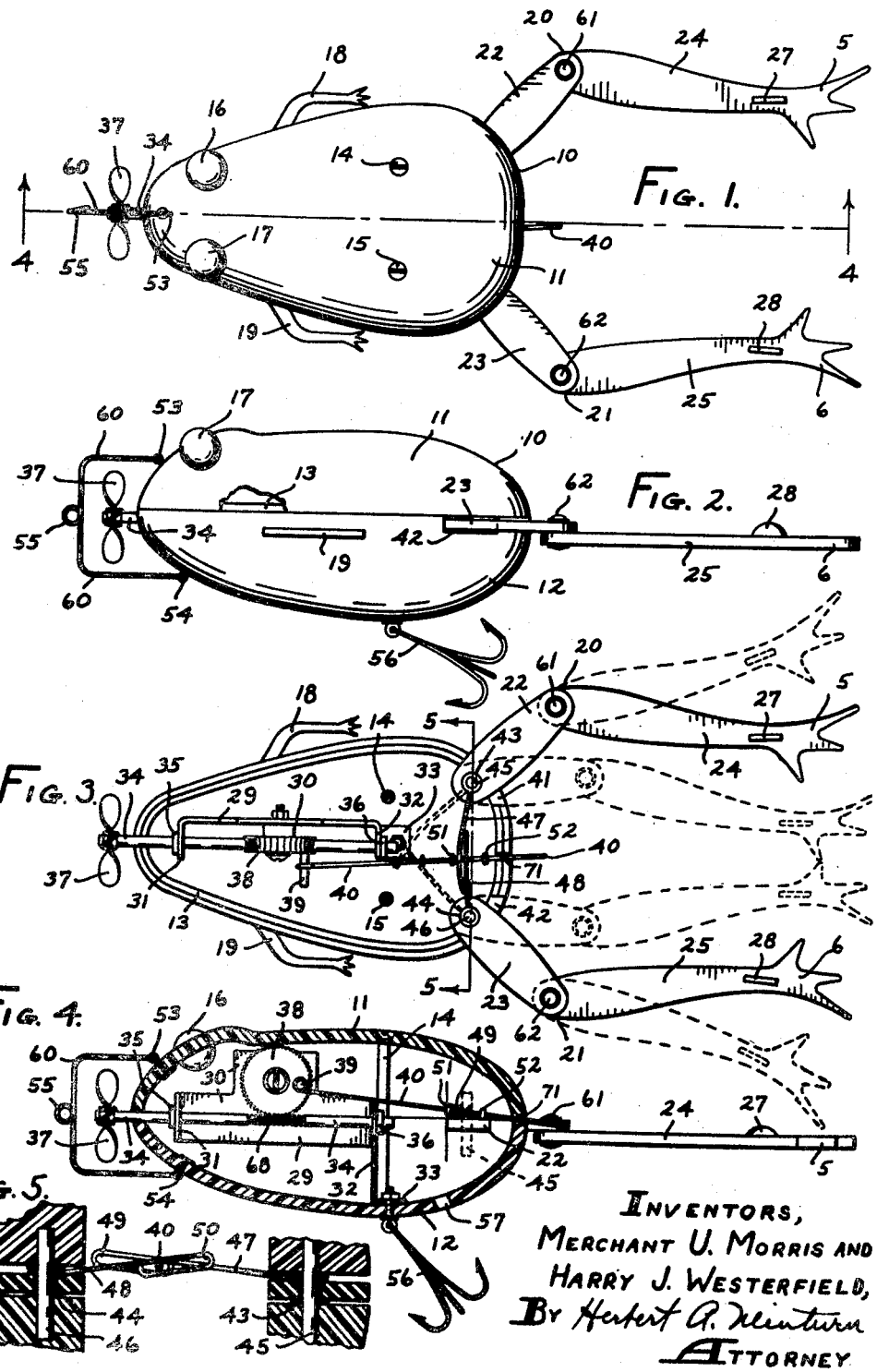
INVENTORS,
MERCHANT U. MORRIS AND
HARRY J. WESTERFIELD,
By Herbert A. Minturn
ATTORNEY Patented Aug. 19, 1952

2,607,151

UNITED STATES PATENT OFFICE 2,607,151

ARTIFICIAL FROG FISHING BAIT

Merchant U. Morris and Harry Joseph
Westerfield, Indianapolis, Ind.

Application July 2, 1949, Serial No. 102,733

4 Claims. (Cl. 43—26.2)

This invention relates to an artificial frog type fishing bait and more particularly to an articulated mechanical frog structure for use in casting and trolling for fish.

A primary object of the invention is to provide a structure which will simulate the appearance and actions of a live frog when it is pulled and maneuvered through water by a fisherman.

A further important object of the invention is to provide such a structure which is resistant to damage when struck by a large fish.

A further object of this invention is to provide a fish bait having the above attributes which can be easily, economically and efficiently manufactured and assembled.

Further objects and advantages of the invention will become apparent to those skilled in the art from the following description of one particular form of the invention as illustrated in the accompanying drawings, in which Fig. 1 is a top plan view of an artificial frog embodying the invention;

Fig. 2 is a view in side elevation thereof;

Fig. 3 is a view in top plan of the lower portion of the structure;

Fig. 4 is a view in section on the line 4—4 in Fig. 1; and

Fig. 5 is a view in section on the line 5—5 in Fig. 3.

Like numerals refer to like parts throughout the several views.

A hollow body generally designated by the numeral 10 is formed from any suitable material such as plastic to resemble the body and head portions of a natural frog. As shown in Figs. 1 and 2 this body consists of an upper back portion 11 and a lower belly portion 12, which pieces marginally match each other to abut on a horizontal plane with a flange 13 upturned from the portion 12 to telescope within the upper portion 11. These two portions are held together by the bolts 14 and 15 which pass freely through the back portion and are screw-threadedly engaged in the belly portion.

A pair of identical eyes 16 and 17 are formed as sealed hollow bodies out of any suitable material including plastic, and are fixed in the back 11 to act as floats to provide buoyancy for the body 10 and also to simulate the eyes of a natural frog.

Short legs 18 and 19 preferably flexible in nature, are fixed to the belly portion 12 to simulate the front legs of a natural frog.

Two articulated rear legs generally designated by the numerals 20 and 21 are formed from a resilient material such as rubber. These legs each have thighs 22 and 23, calves 24 and 25 revolubly connected to said thighs, and feet 5 and 6 fixed on the free ends of the calves. Upright fins 27 and 28 are fixed on the tops of the feet 5 and 6 respectively in longitudinally disposed, vertical planes.

The body, legs and eyes are colored to resemble the coloring of a natural frog, the exact shading and marking being a matter of choice and not constituting a part of this invention.

A bracket member 29 formed from flat thin material such as sheet metal, consists of flat vertical portion 30 longitudinally disposed inside of the body 10 with transversely disposed vertical flanges 31 and 32 extending in the same direction from the front and rear ends of said longitudinal portion 29. The rear flange 32 has a horizontal foot 33 integrally formed on the bottom end thereof and which is bolted to the belly 12 to hold the support member 29 in fixed position within the body 10.

A propeller shaft 34 longitudinally disposed in the body 10 is journaled on the front end of the belly 12 and extends through the flanges 31 and 32, to be held against longitudinal movement by stops 35 and 36 which are fixed on the shaft 34 to abut the outer faces of the flanges 31 and 32. The forward end of the shaft 34 extends from the front end of the belly 12 and has a propeller 37 fixed thereon.

A worm wheel 38 is revolubly mounted on a horizontal axis on the bracket 30 directly over the propeller shaft 34 and in constant mesh with a worm 68 integrally formed on the shaft 34. A crank pin 39 is fixed to extend from the face of the worm wheel 38 opposite from that face toward the bracket 30 and near the outer periphery of the wheel. A connecting rod 40 is revolubly connected by its forward end to the crank pin 39. This connecting rod 40 is slidably guided through the hole 71 in the rear end of the belly 12. Thus as the worm wheel 38 may be revolved, the connecting rod 40 will reciprocate longitudinally in a vertical plane.

The thigh portions 22 and 23 of the articulated rear legs 20 and 21 respectively enter the body through the slots 41 and 42 across the margin of the belly portion 12. The inner ends of said thigh portions have sleeves 43 and 44 fixed therein. These sleeves are revolubly mounted respectively on vertically disposed pins 45 and 46 carried by the belly 12 and extending upwardly to be engaged in the back 11. Thus the thighs are revoluble around the pins 45 and 46 in a horizontal plane and the calves 24 and 25 are also revoluble with respect to the thighs in substantially the same horizontal plane.

Wire members 47 and 48, formed from any suitable resilient wire such as piano wire, are compressively fixed to the thighs 22 and 23 respectively under the overturned top ends of the sleeves 43 and 44 respectively to extend therefrom inwardly to cross the rod 40, Figs. 4 and 5.

The free ends of the wire members 47 and 48 are formed into elongated loops 49 and 50 respectively, to receive the connecting rod 40 therethrough. These loops 49 and 50 are wide enough to permit the connecting rod 40 to pass freely therethrough and are comparatively long so as to permit transverse movement of said loops relative to the connecting rod, as best shown in Fig. 5.

Suitable stops 51 and 52 are fixed on the connecting rod 40 to have the loops 49 and 50 lie therebetween to prevent longitudinal movement of said loops relative to the rod. Thus, upon the fore and aft reciprocation of the connecting rod 40, these stops will cause fore and aft oscillation of the loops 49 and 50, to in turn through their respective wire members 47 and 48 oscillate the thighs 22 and 23.

A bail 60 is pivotally mounted on the front of the body 10 by eyes 53 and 54 carried respectively by the back 11 and the body 12, to provide a weed protector for the propeller 37 and also to carry an eye 55 to which a leader or a fish line (not shown) can be attached.

Fishhooks, such as the gang 56, are fixed to the body at any desired location, the exact location of such hooks being a matter of choice and not constituting a part of this invention. A drain hole 57 is provided in the rear lower portion of the belly 12.

Operation

The loop 55 is engaged by the leader or the end of a fishing line and the artificial frog is cast and pulled through the water.

As the body 10 is pulled through water the water resistance rotates the propeller 37. Rotation of the propeller rotates the shaft 34 and the worm 68 thereon. Rotation of the worm 68 rotates the worm wheel 38 to revolve the crank pin 39 which action in turn reciprocates the connecting rod 40 and the stops 51 and 52 to push and pull the loops 49 and 50 and thus oscillate the thighs 22 and 23. The calves 24 and 25 are tended to be pulled toward and away from each other but their oscillation is limited by the fins 27 and 28 which tend to remain in planes parallel to the direction in which the artificial frog is moving by reason of water resistance on their sides. Thus the calves are at times directly behind the body, whether the thighs are at their innermost positions, as shown in broken lines in Fig. 3 or in their outermost positions as is shown in solid lines in Fig. 3.

The calves 24 and 25, under water resistance to change of position, normally would tend to remain in the solid line positions, if the thighs were stationary. However, as the knee pivot rivets 61 and 62 are swung from the solid line to dash line positions, Figs. 3 and 4, the relatively upper ends of the calves 24 and 25 would be carried one toward the other with the feet 5 and 6 spread apart as shown in the outermost dash line position. These feet positions, however are quickly changed by reason of the water pressure against the then outwardly inclined vanes 27 and 28, to bring those feet 5 and 6 toward one another to the innermost dash line positions. This action sets up a very natural frog leg, kicking action as it propels itself through the water.

It should be noted that due to the resilient construction of the articulated legs and the resilient wire drive members, the artificial frog is not normally damaged when the legs may be bent or distorted from their positions in the operating cycle, as would occur when the frog is struck by a fish. Thus the frog is usable over long periods of time.

While we have herein shown and described our invention in the one particular form, it is obvious that structural changes may be made without departing from the spirit of the invention, and we therefore do not desire to be limited to that precise form beyond the limitations which may be imposed by the following claims.

We claim:

1. An artificial fishing bait comprising a hollow body formed to resemble the body of a natural frog; said body having hollow eyes fixed therein to act as floats and provide buoyancy for said body; support means fixed within said body; a longitudinally disposed propeller shaft revolubly carried by said support means, said shaft having an end extending from the front end of said body; a propeller fixed to the extended end of the propeller shaft; a first worm gear formed on said propeller shaft; a second worm wheel carried by support means in constant mesh with said first worm gear; a connecting rod pivotally connected to said second worm wheel near its outer periphery; said body having a hole in its rear end in which said connecting rod is slidably movable, said hole thus acting as a guide for said connecting rod; a pair of sleeves revolubly connected to said body; a pair of articulated rear legs fixed to said sleeves, each of said legs consisting of a thigh and a calf pivotally connected to said thigh; said legs being formed from a resilient material; a pair of resilient wires, one fixed to each of said sleeves, and each of said wires having an elongated loop in its free end encircling the connecting rod; a pair of stops fixed to said connecting rod on opposite sides of the loops; whereby rotation of said propeller will actuate said worm gear, said worm wheel will oscillate said connecting rod; reciprocation of said connecting rod will oscillate said loops, and oscillation of said loops will oscillate said thighs.

2. An artificial fishing bait comprising a hollow body formed to resemble the body of a natural frog; said body having hollow eyes fixed therein to act as floats and provide buoyancy for said body; support means fixed within said body; a longitudinally disposed propeller shaft revolubly carried by said support means, said shaft having an end extending from the front end of said body; a propeller fixed to the extended end of the propeller shaft; a first worm gear formed on said propeller shaft; a second worm wheel carried by support means in constant mesh with said first worm; a connecting rod pivotally connected to said second worm wheel near its outer periphery; said body having a hole in its rear end in which said connecting rod is slidably movable, said hole thus acting as a guide for said connecting rod; a pair of sleeves revolubly connected to said body; a pair of articulated rear legs fixed to said sleeves, each of said legs consisting of a thigh and a calf pivotally connected to said thigh; said legs being formed from a resilient material; a pair of resilient wires, one fixed to each of said sleeves, and each of said wires having an elongated loop in its free end encircling the connecting rod; a pair of stops fixed to said connecting rod on opposite sides of the loops; whereby rotation of said propeller will actuate said worm gear, said worm wheel will oscillate said connecting rod; reciprocation of said connecting rod will oscillate said loops, and oscillation of said loops will oscillate said thighs; a longitudinally disposed fin fixed on the outer end of said calves and thus maintaining said calves in parallel relation to the longitudinal axis of said body when said artificial bait is dragged through water.

3. An artificial bait comprising a hollow body; a propeller shaft rotatably mounted in and extending from the body in a forward direction; a propeller on the forward end of the shaft; a pair of legs each pivoted to the body in such manner that they may be rocked in a substantially horizontal plane; each leg being formed in two parts, namely a thigh portion adjacent the body, and a calf portion freely pivoted to an end of the thigh portion in such a manner as to constrain the calf portion to motion in a substantially horizontal plane; a vertical fin on the outer end portion of each of said calf portions; a lever fixed to each thigh portion and extending inwardly of said body; a rod member reciprocated in a fore and aft direction by the turning of said shaft; each of said levers having an eye overlapping the other; said rod extending through both of said eyes; and spaced abutments fixed on said rod, between which said eyes are carried.

4. An artificial bait comprising a hollow body; a propeller shaft rotatably mounted in and extending from the body in a forward direction; a propeller on the forward end of the shaft; a pair of legs each pivoted to the body in such manner that they may be rocked in a substantially horizontal plane; each leg being formed in two parts, namely a thigh portion adjacent the body, and a calf portion freely pivoted to an end of the thigh portion in such a manner as to constrain the calf portion to motion in an also substantially horizontal plane; a vertical fin on the outer end portion of each of said calf portions; a lever fixed to each thigh portion and extending inwardly of said body; a rod member reciprocated in a fore and aft direction by the turning of said shaft; each of said levers having an eye overlapping the other; said rod extending through both of said eyes; and spaced abutments fixed on said rod, between which said eyes are carried; a bouyancy member at the front upper portion of the body; and said body having a drain hole in its lower rear portion whereby said body may be held substantially horizontally as water enters the body to force air therefrom from the rear portion.

MERCHANT U. MORRIS.
HARRY JOSEPH WESTERFIELD.

REFERENCES CITED

The following references are of record in the file of this patent:

UNITED STATES PATENTS

| Number | Name | Date |
|---|---|---|
| 207,188 | Martin | Aug. 20, 1878 |
| 638,885 | Peterson et al. | Dec. 12, 1899 |
| 941,911 | Burthe | Nov. 30, 1909 |
| 1,390,601 | Caldwell | Sept. 13, 1921 |
| 1,430,642 | Gross | Oct. 3, 1922 |
| 1,833,522 | Goble | Nov. 24, 1931 |
| 2,516,133 | Martin | July 25, 1950 |
| 2,555,802 | Martin | June 5, 1951 |